US012679113B2

(12) United States Patent
Murashima et al.

(10) Patent No.: US 12,679,113 B2
(45) Date of Patent: Jul. 14, 2026

(54) DRYING APPARATUS

(71) Applicant: KYOCERA Document Solutions Inc., Osaka (JP)

(72) Inventors: Masaki Murashima, Osaka (JP); Hiroyuki Ueda, Osaka (JP); Minoru Tokonami, Osaka (JP); Mitsuhiro Goda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 169 days.

(21) Appl. No.: 18/892,315

(22) Filed: Sep. 20, 2024

(65) Prior Publication Data

US 2025/0100299 A1 Mar. 27, 2025

(30) Foreign Application Priority Data

Sep. 22, 2023 (JP) ................................ 2023-158441

(51) Int. Cl.
*B41J 11/00* (2006.01)

(52) U.S. Cl.
CPC .......... *B41J 11/0022* (2021.01); *B41J 11/007* (2013.01)

(58) Field of Classification Search
CPC ............................ B41J 11/0022; B41J 11/007
See application file for complete search history.

(56) References Cited

FOREIGN PATENT DOCUMENTS

JP 2022148189 A * 10/2022

* cited by examiner

*Primary Examiner* — Bradley W Thies
(74) *Attorney, Agent, or Firm* — Studebaker Brackett PLLC

(57) ABSTRACT

A drying apparatus includes a conveying unit, a heater unit, a casing, a lifting mechanism, and a closing member. The conveying unit supports and conveys the recording medium in a predetermined conveyance direction. The heater unit is disposed above the conveying unit, and blows a high temperature air to the conveyed recording medium. The casing houses the heater unit. The lifting mechanism is provided in the casing and supports the heater unit so as to be lifted and lowered. The closing member comes into contact with the heater unit when the heater unit is lowered, and separates a heating space below the heater unit from an internal space of the casing. The closing member is lifted and lowered within a predetermined range as the heater unit is lifted and lowered.

3 Claims, 7 Drawing Sheets

DRYING APPARATUS

INCORPORATION BY REFERENCE

This application is based on and claims the benefit of priority from Japanese patent application No. 2023-158441 filed on Sep. 22, 2023, which is incorporated by reference in its entirety.

BACKGROUND

The present disclosure relates to a drying apparatus which dries a recording medium on which an image is formed by an inkjet recording method, under a high temperature atmosphere while conveying the recording medium.

An image forming system including an inkjet type image forming apparatus is provided with a drying apparatus which dries an image formed on a recording medium by ink. The drying apparatus includes a conveying unit which conveys the medium on which the image is formed by an inkjet method, and a heater unit for drying the medium conveyed by the conveying unit.

The heater unit generally includes a plurality of infrared heaters, a reflector which reflects infrared ray emitted from each infrared heater, and a fan. The infrared heaters and the reflectors are housed in a casing with an open lower surface. Infrared rays emitted from the infrared heaters are reflected by the reflectors and irradiated downward. The fan is supported on the top surface of the casing and blows taken air downward.

In such a drying apparatus, when the recording medium conveyed by the conveying unit is jammed, a driving of the heating part (corresponding to the heater unit) of the drying apparatus is stopped.

In addition, the heater unit may be provided so as to be capable of lifting and lowering in order to treat the jamming of the recording medium conveyed by the conveying unit. In this case, the heater unit is housed in a casing with an open lower surface, and is lifted and lowered by a lifting mechanism supported on the casing. When treating the jamming, the heater unit is lifted by the lifting mechanism, and a space for removing the jammed sheet is formed between the heater unit and the conveying unit.

A space below the heater unit is a heating space in which a temperature is increased by heated air. When the heated air in the heating space enters the inside of the casing, the inside of the casing is also heated. Then, the parts constituting the lifting mechanism supported on the casing are exposed to high temperature, and the parts with low heat resistance may be damaged.

For this reason, a sponge abutting on the heater unit when the heater unit is lowered may be provided to separate the heating space below the heater unit from the space in the casing. However, if the position of the heater unit when it is lowered varies or the sponge is deformed, the effect of separating the space is reduced.

SUMMARY

A drying apparatus according to the present disclosure dries a recording medium on which an image is formed, while conveying the recording medium. The drying apparatus includes a conveying unit, a heater unit, a casing, a lifting mechanism, and a closing member. The conveying unit supports and conveys the recording medium in a predetermined conveyance direction. The heater unit is disposed above the conveying unit, and blows a high temperature air to the conveyed recording medium. The casing houses the heater unit. The lifting mechanism is provided in the casing and supports the heater unit so as to be lifted and lowered. The closing member comes into contact with the heater unit when the heater unit is lowered, and separates a heating space below the heater unit from an internal space of the casing. The closing member is lifted and lowered within a predetermined range as the heater unit is lifted and lowered.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, a drying apparatus according to one embodiment of the present disclosure will be described.

Figure 1:
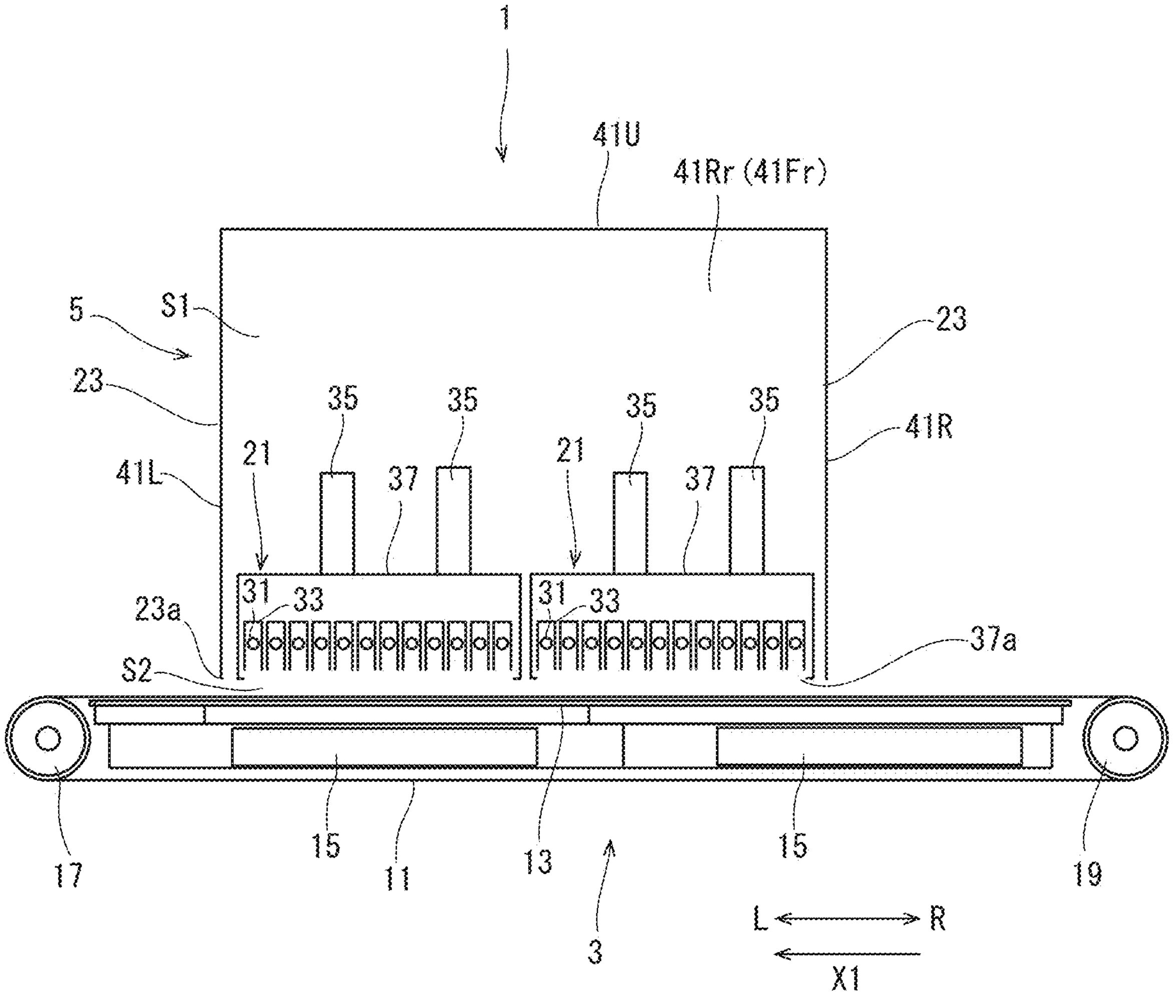
FIG. 1 is a front view schematically showing an inside of a drying apparatus according to one embodiment of the present disclosure.

First, the entire structure of the drying apparatus 1 will be described with reference to FIG. 1. FIG. 1 is a front view showing the inside of the drying apparatus 1. In each figure, Fr, Rr, L and R indicate the front, rear, left and right sides of the drying apparatus 1, respectively.

The drying apparatus 1 includes a conveying unit 3 which conveys a medium (a cut sheet, a long sheet, and the others) on which an image is formed by an inkjet method along a conveyance direction X1 (a direction from the right to the left in FIG. 1), and a heating unit 5 drying the medium conveyed by the conveying unit 3.

Figure 2:
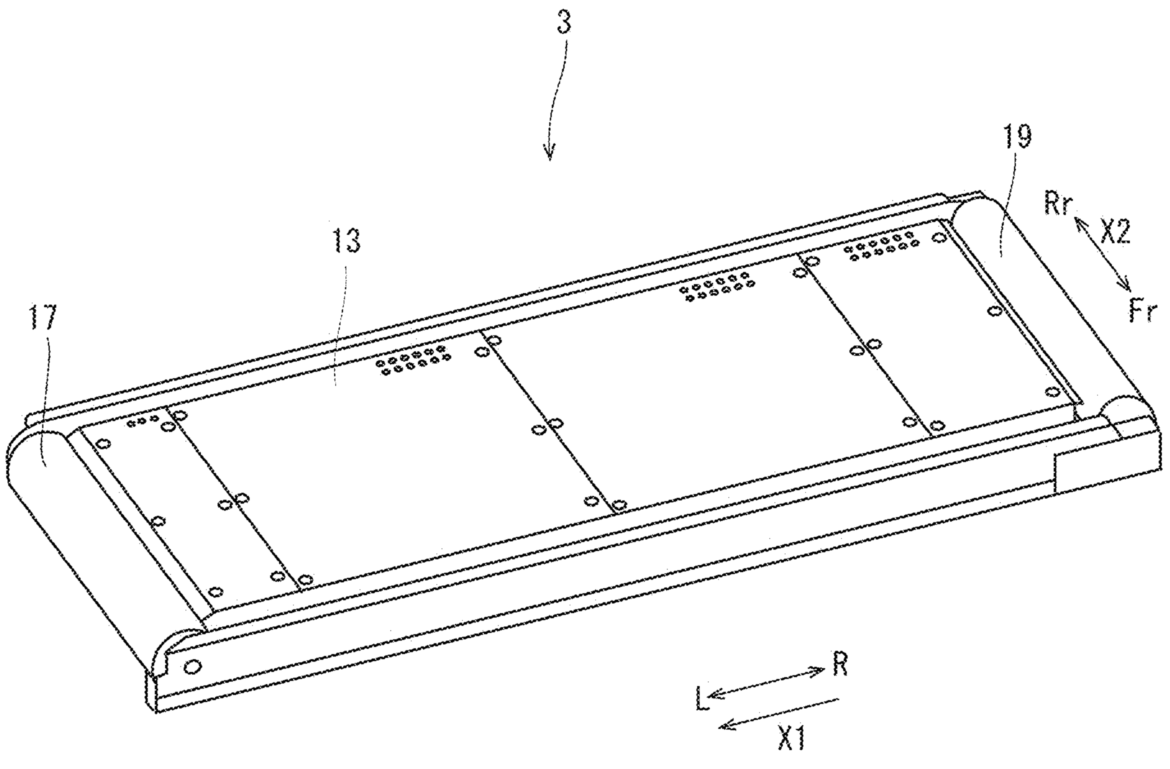
FIG. 2 is a perspective view showing a conveying unit (a conveying belt not shown) in the drying apparatus according to the embodiment of the present disclosure.

First, the conveying unit 3 will be described with reference to FIG. 1 and FIG. 2. FIG. 2 is a perspective view showing the conveying unit 3 (a conveying belt 11 is not shown). As shown in FIG. 1 and FIG. 2, the conveying unit

3 includes a conveying belt 11 which conveys the medium, a conveying plate 13 which supports the conveying belt 11, and a suction device 15 which attracts the medium to the conveying belt 11.

The conveying belt 11 is an endless belt, and a number of through-holes penetrating in the thickness direction are formed on the entire surface. The conveying belt 11 is wound around a driving roller 17 and a driven roller 19. When the driving roller 17 is driven by a motor (not shown) to be rotated, the conveying belt 11 travels in the counter-clockwise direction of FIG. 1. The outer surface of the conveying belt 11 along the upper track is the conveying surface on which the medium is conveyed.

The conveying plate 13 will be described. The conveying plate 13 is in contact with the inner circumferential surface (the surface opposite to the conveying surface) of the conveying belt 11 traveling on the upper track to support the conveying belt 11. When the conveying belt 11 travels, the inner circumferential surface of the conveying belt 11 slides along the upper surface of the conveying plate 13. A large number of through-holes penetrating in the thickness direction are formed on the entire surface of the conveying plate 13.

The suction device 15 is arranged in the hollow space of the conveying belt 11. When the suction device 15 is driven, air in the through-holes of the conveying belt 11 and the through-holes of the conveying plate 13 is taken in, and the medium is attracted to the conveying surface of the conveying belt 11.

Figure 3:
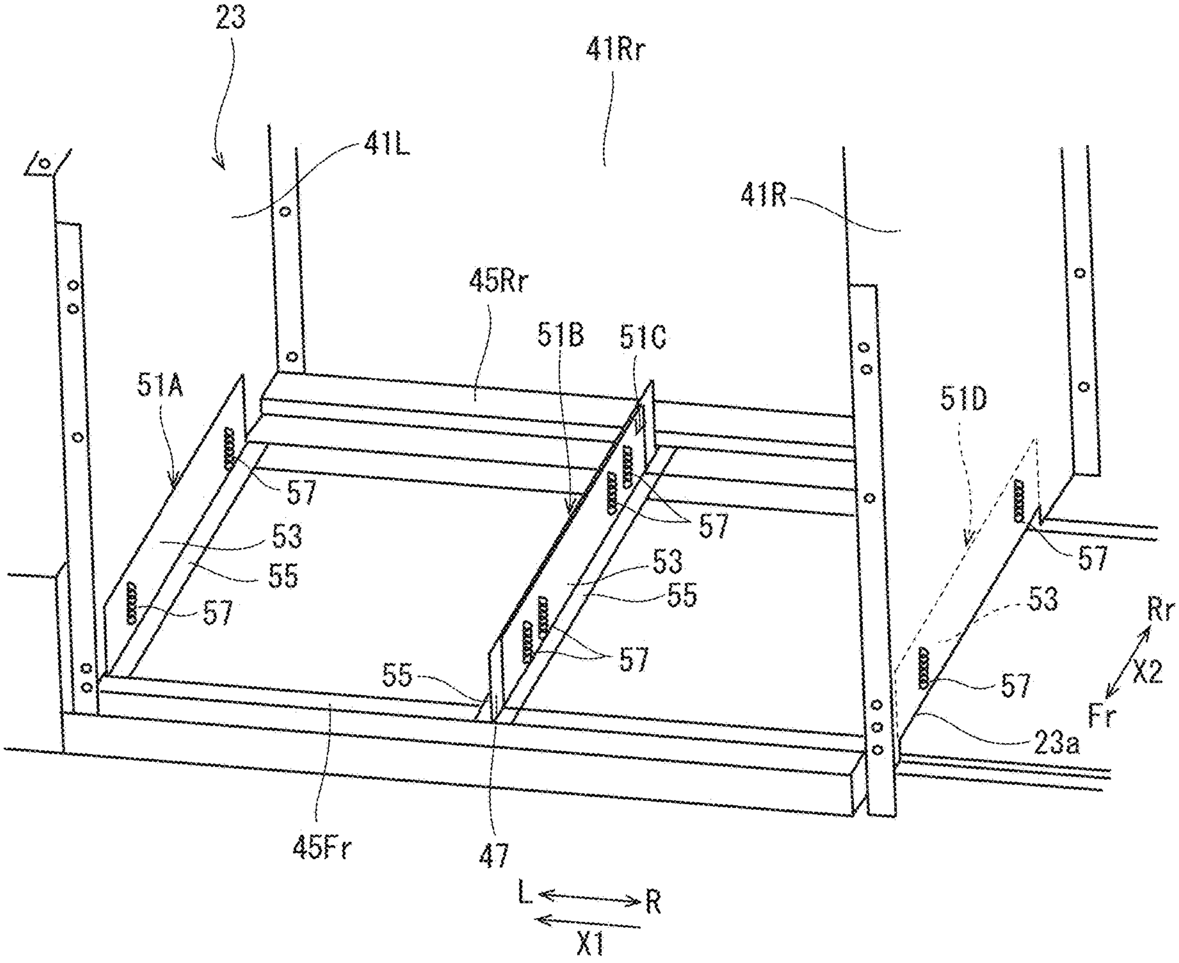
FIG. 3 is a perspective view showing a closing member in the drying apparatus according to the embodiment of the present disclosure.
Figure 4:
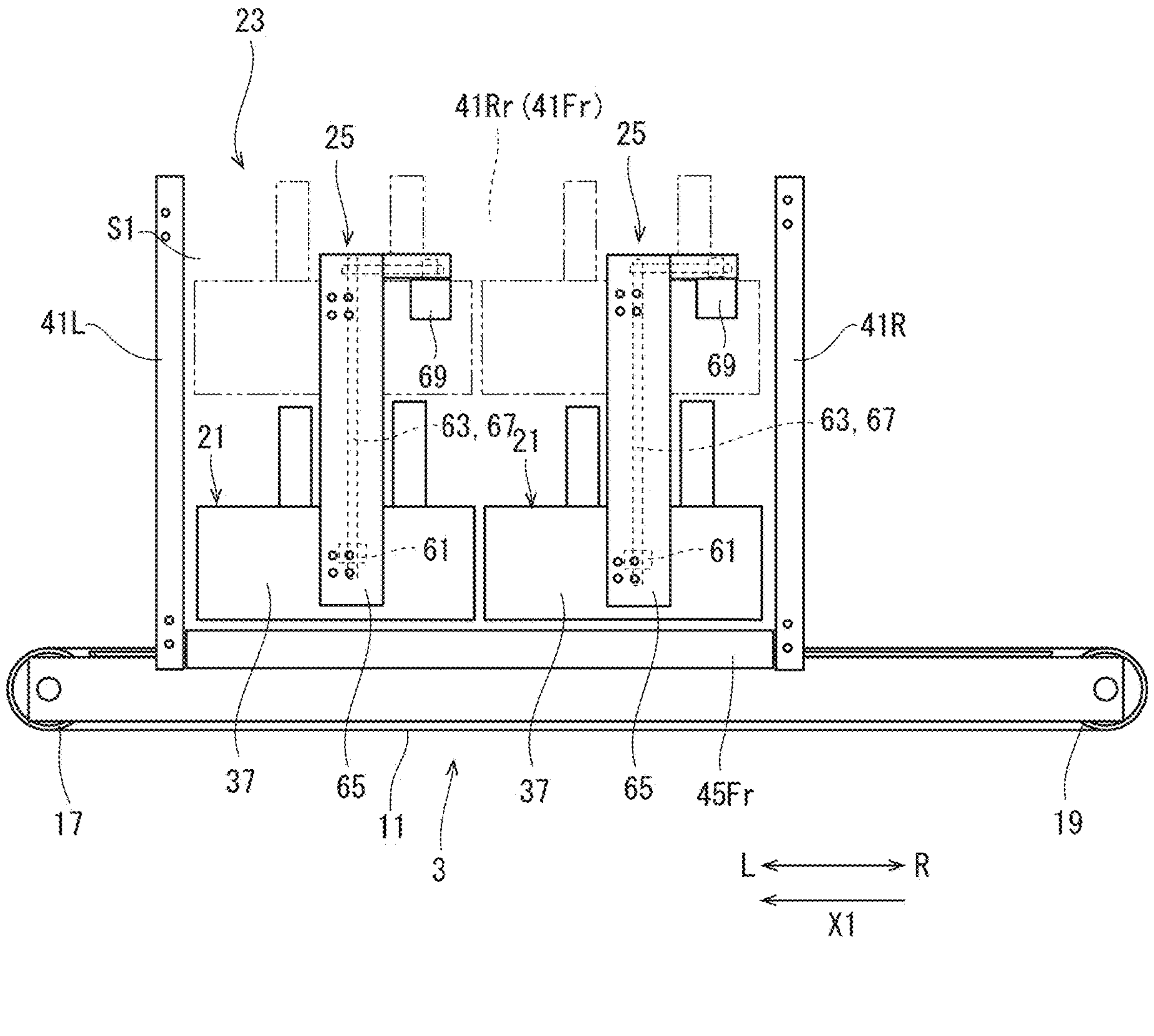
FIG. 4 is a front view schematically showing a lifting mechanism in the drying apparatus according to an embodiment of the present disclosure.

Next, the heating unit 5 will be described with reference to FIG. 1 and FIG. 3 to FIG. 7B. FIG. 3 is a perspective view showing a closing member, FIG. 4 is a front view showing a lifting mechanism, and FIG. 5A to FIG. 7B are front views showing a heater unit.

As shown in FIG. 1, the heating unit 5 is disposed above the conveying unit 3 at the slightly downstream from the center portion in the conveyance direction X1. The heating unit 5 is provided with two heater units 21, a casing 23 in which the two heater units 21 are housed, and a lifting mechanism 25 (see FIG. 4) which supports the two heater units 21 to the casing 23 so as to be lifted and lowered.

First, the heater unit 21 will be described with reference to FIG. 1, FIG. 5A, FIG. 6, and FIG. 7A. The heater unit 21 includes a plurality of infrared heaters 31, a reflector 33 which reflects infrared ray emitted from each infrared heater 31, two fans 35, and a heater casing 37 which supports them.

The heater casing 37 has a box shape with an open lower surface, and has left and right side plates facing in the conveyance direction X1, front and rear side plates facing in the width direction X2 intersecting the conveyance direction X1, and a top plate. On the lower edges of the left and right side plates, a lower edge portion is formed which bends inwardly at a substantially right angle.

The infrared heaters 31 and the reflectors 33 are arranged side by side in the conveyance direction X1, and housed in the heater casing 37. Infrared rays emitted from the infrared heaters 31 are reflected by the reflectors 33 and irradiated downward.

The two fans 35 are provided on the upper surface of the top plate of the heater casing 37. The fan 35 takes in air outside the heater casing 37, and blows the air downward toward the inside of the heater casing 37.

The two heater units 21 are arranged side by side in the conveyance direction X1. A predetermined gap is opened between the heater units 21.

Next, the casing 23 will be described. As shown in FIG. 1, the casing 23 is formed in a box shape with an open lower surface and an internal space S1 capable of housing the two heater units 21. Between the open lower surface 23*a* of the casing 23 and the conveying surface of the conveying belt 11 of the conveying unit 3, a heating space S2 having a predetermined height is formed.

The casing 23 has left and right side plates 41L and 41R facing in the conveyance direction X1, front and rear side plates 41Fr and 41Rr facing in the width direction X2, and a top plate 41U. As shown in FIG. 3, front and rear beam members 45Fr and 45Rr are disposed between the lower end portions of the left and right side plates 41L and 41R. A vertical partition plate 47 is disposed between the central portions of the front and rear beam members 45Fr and 45Rr. The partition plate 47 corresponds to the gap between the heater units 21 (see FIG. 1) arranged in the conveyance direction X1.

As shown in FIG. 3, four closing members 51A, 51B, 51C, and 51D (collectively referred to as the closing member 51) are supported on the casing 23. The closing member 51 is an L-shaped member viewed from the front side, has a length equal to the interval between the front and rear beam members 45Fr and 45Rr of the casing 23, and has a vertical piece 53 and a horizontal piece 55 bent at a substantially right angle from the lower end of the vertical piece 53. The four closing members 51A, 51B, 51C, and 51D are supported vertically movably on the lower end portion of the inner surface of the left side plate 41L, the lower end portions of both side surfaces of the partition plate 47, and the lower end portion of the inner surface of the right side plate 41R, respectively.

Specifically, the vertical pieces 53 of the four closing members 51A, 51B, 51C, and 51D are supported so as to be movable in the upper-and-lower direction along the lower end portion of the inner surface of the left side plate 41L, the lower end portions of both the side surfaces of the partition plate 47, and the lower end portion of the inner surface of the right side plate 41R, respectively. Thus, the horizontal piece 55 of the closing member 51A supported on the left side plate 41L and the horizontal piece 55 of the closing member 51B supported on the downstream side surface of the partition plate 47 extend in a direction facing each other. The horizontal piece 55 of the closing member 51C supported on the upstream side surface of the partition plate 47 and the horizontal piece 55 of the closing member 51D supported on the right side plate 41R extend in a direction facing each other.

The four closing members 51 are biased upward by coil springs 57. The coil portions of the coil springs 57 are housed in openings formed in the left side plate 41L, the partition plate 47, the right side plate 41R and the closing members 51. The upper ends of the coil springs 57 are fixed to the left side plate 41L, the partition plate 47, and the right side plate 41R above the openings. The lower ends of the coil springs 57 are fixed to the vertical pieces 53 of the closing members 51. When the coil spring 57 is in its natural length, the horizontal piece 55 of the closing member 51 is positioned above the open lower surface 23*a* of the casing 23. The coil spring 57 is an example of the biasing member which supports the closing member 51 on the casing 23 so as to be movable in the upper-and-lower direction.

Next, the lifting mechanism 25 will be described. As described above, the lifting mechanism 25 supports the two heater units 21 on the casing 23 so as to be lifted and lowered. The lifting mechanism 25 lifts and lowers the two heater units 21 to a heating position (see FIG. 1) at which the open lower surface 37*a* (see FIG. 1) of the heater casing 37 is on the same height as the open lower surface 23*a* of the casing 23, and a retracted position higher than the heating position. In the retracted position, a space capable of treating the sheet jamming is formed between the two heater units 21 and the conveying surface of the conveying belt 11.

For the lifting mechanism 25, for example, a ball screw mechanism can be used. As shown in FIG. 4, the ball screw mechanism includes nuts 61 fixed to the front and rear side plates of the heater casing 37 of each heater unit 21, and screw shafts 63 supported by the casing 23 and screwed with the nuts 61. The upper and lower ends of the screw shaft 63 are rotatably supported by base plates 65 fixed to the inner surfaces of the front and rear side plates 41Fr and 41Rr (see FIG. 1) of the casing 23 through bearings. Further, a guide rail 67 engaged with the nut 61 is formed along the upper-and-lower direction on the base plate 65. A motor 69 is connected to the upper end of the screw shaft 63. As the motor 69 is driven and rotated, the screw shaft 63 is rotated, and the nuts 61 are lifted and lowered along the guide rail 67. Thereby, the heater unit 21 fixed to the nuts 61 is lifted and lowered.

The drying operation of the drying apparatus 1 having the above structure will be described. In the conveying unit 3, the motor is driven, the driving roller 17 is rotated, and the conveying belt 11 travels. Thereafter, the recording medium on which the image is formed by the inkjet method is conveyed to the conveying surface of the conveying belt 11. The suction device 15 is driven. Thereby, as described above, air in the through-holes of the conveying belt 11 and the through-holes of the conveying plate 13 is taken in, and the upper space of the conveying surface of the conveying belt 11 becomes negative pressure. Then, the recording medium is attracted to the conveying surface. As described above, the recording medium is conveyed along the conveyance direction X1 while being attracted to the conveying surface.

Figure 5A:
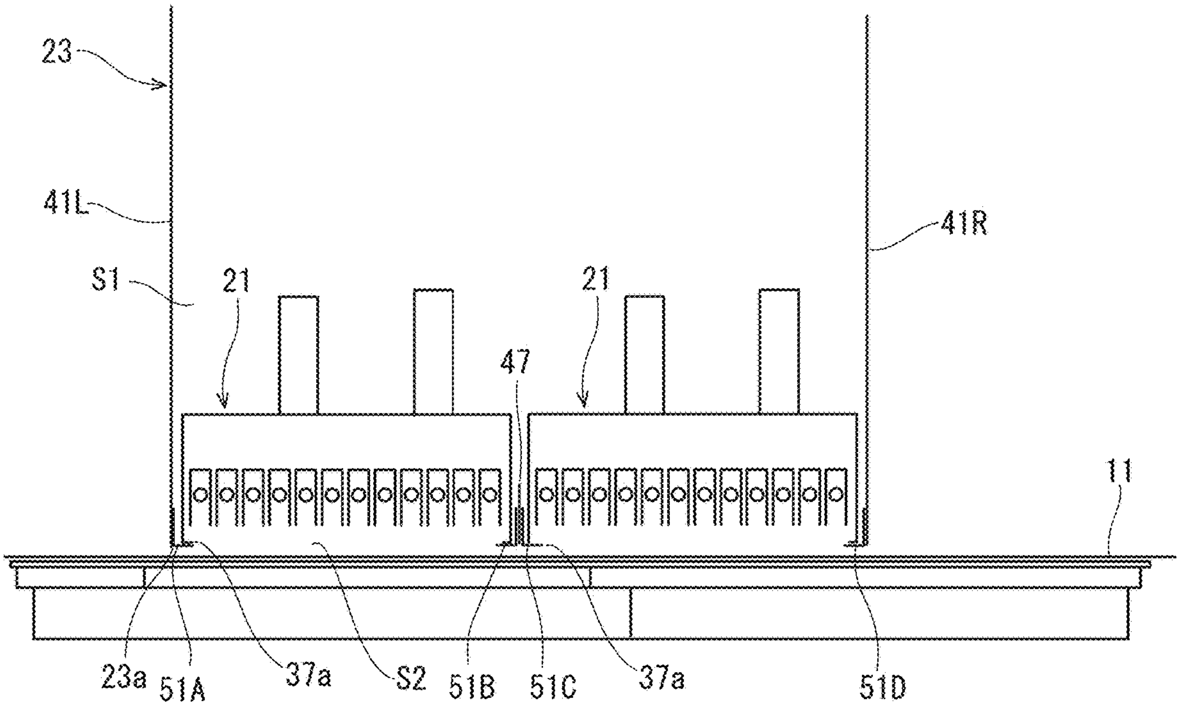
FIG. 5A is a front view showing a heater unit at drying operation, in the drying apparatus according to the embodiment of the present disclosure.
Figure 5B:
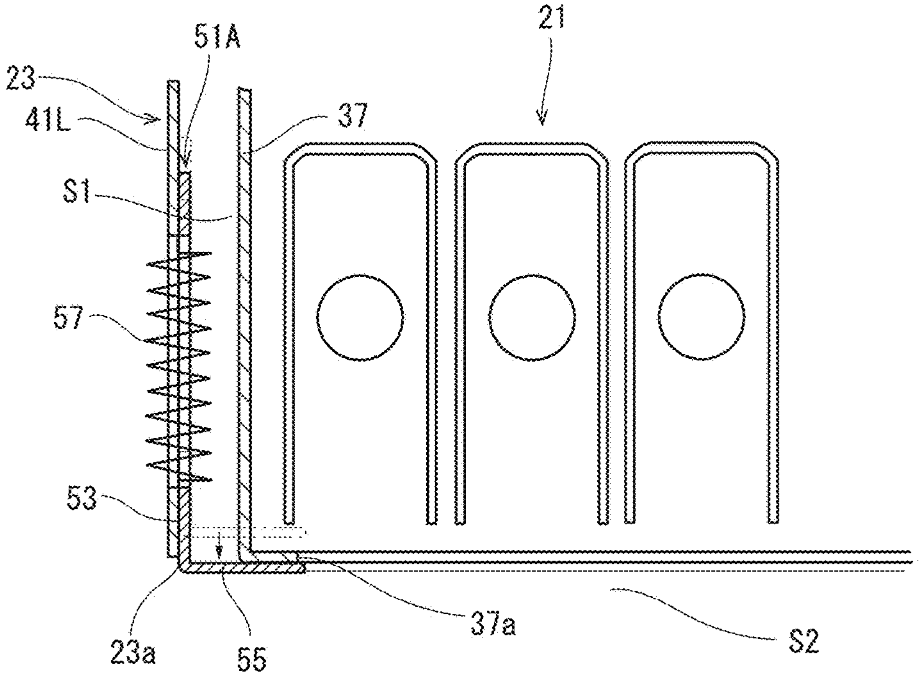
FIG. 5B is an enlarged view of a part (the closing member) of FIG. 5A.

As shown in FIG. 5A and FIG. 5B, the two heater units 21 are lowered to the heating position by the lifting mechanism 25 (see FIG. 4). That is, the open lower surface 37*a* of the heater casing 37 of the heater unit 21 is positioned at substantially the same height as the open lower surface 23*a* of the casing 23. The heater unit 21 is driven to heat the heating space S2. Thus, the image on the recording medium conveyed on the conveying surface of the conveying belt 11 is dried.

Figure 7A:
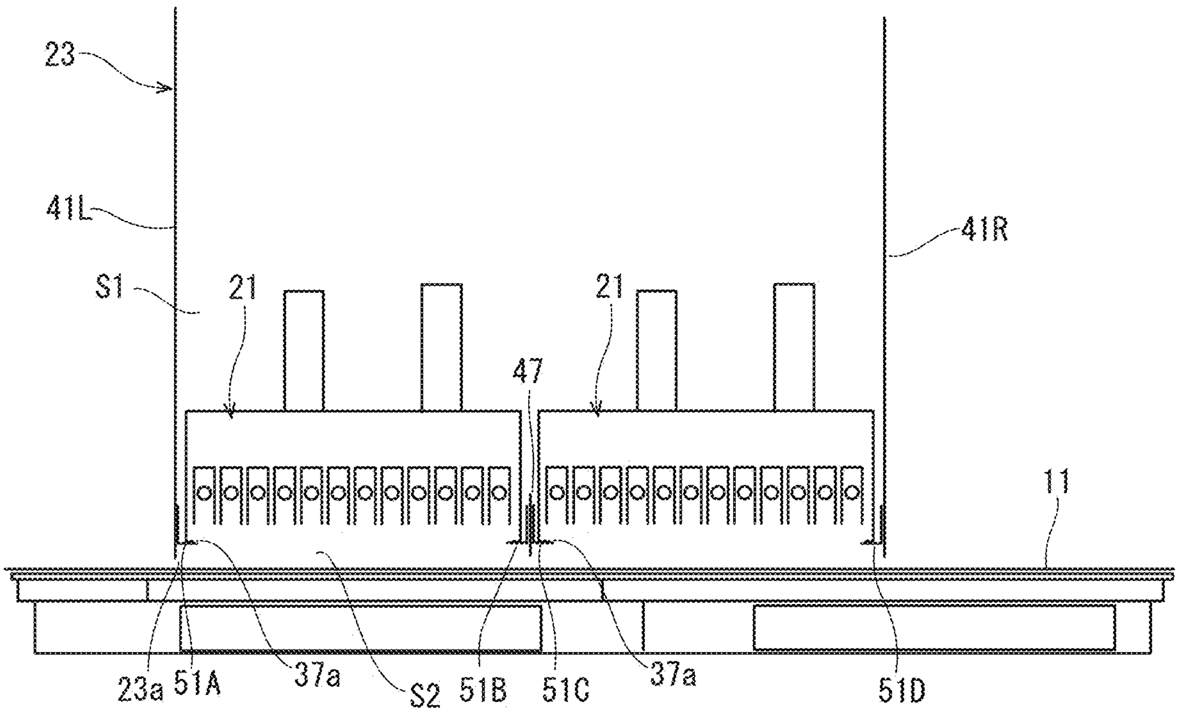
FIG. 7A is a front view showing the heater unit abutting on the closing member when it is lowered, in the drying apparatus according to the embodiment of the present disclosure.
Figure 7B:
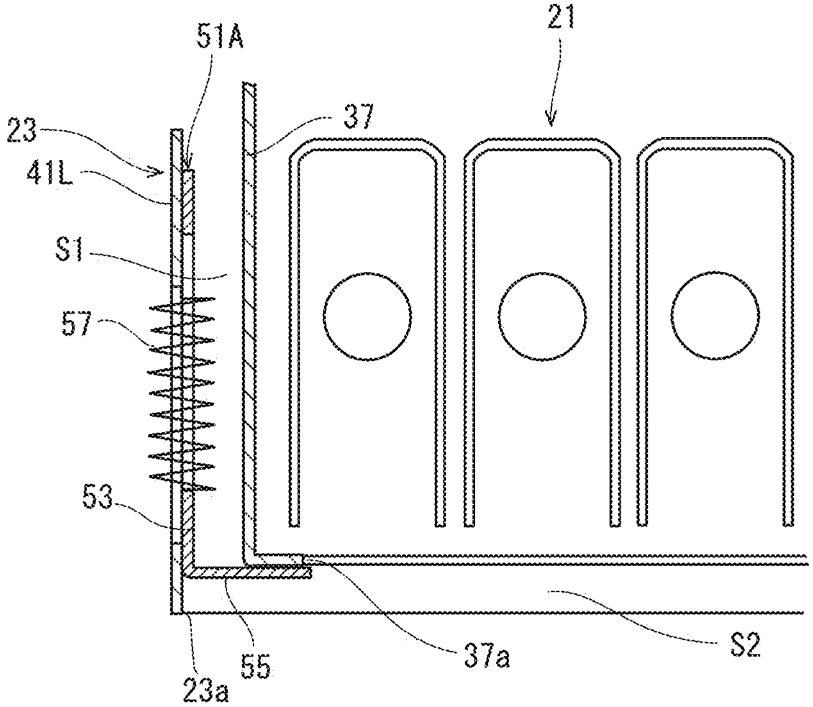
FIG. 7B is an enlarged view of a part (the closing member) of FIG. 7A.

Here, the movement of the closing member 51 when the heater unit 21 is lowered will be described. As the two heater units 21 is lowered from the retracted position to the heating position, the lower edges of the side plates of the heater casings 37 of the two heater units 21 abut on the horizontal pieces 55 of the four closing members 51 as shown in FIG. 7A and FIG. 7B. Further, as the two heater units 21 are lowered, as shown in FIG. 5A and FIG. 5B, the horizontal pieces 55 of the four closing members 51 are pressed downward by the heater casings 37, and the four closing members 51 are lowered against the biasing force of the coil springs 57 (see the arrows in FIG. 5B). As a result, the gap between the two heater units 21 and the casing 23 and the gap between the two heater units 21 are closed by the horizontal pieces 55 of the four closing members 51. In this way, the heating space S2 and the internal space S1 of the casing 23 are separated during the drying operation.

Figure 6A:
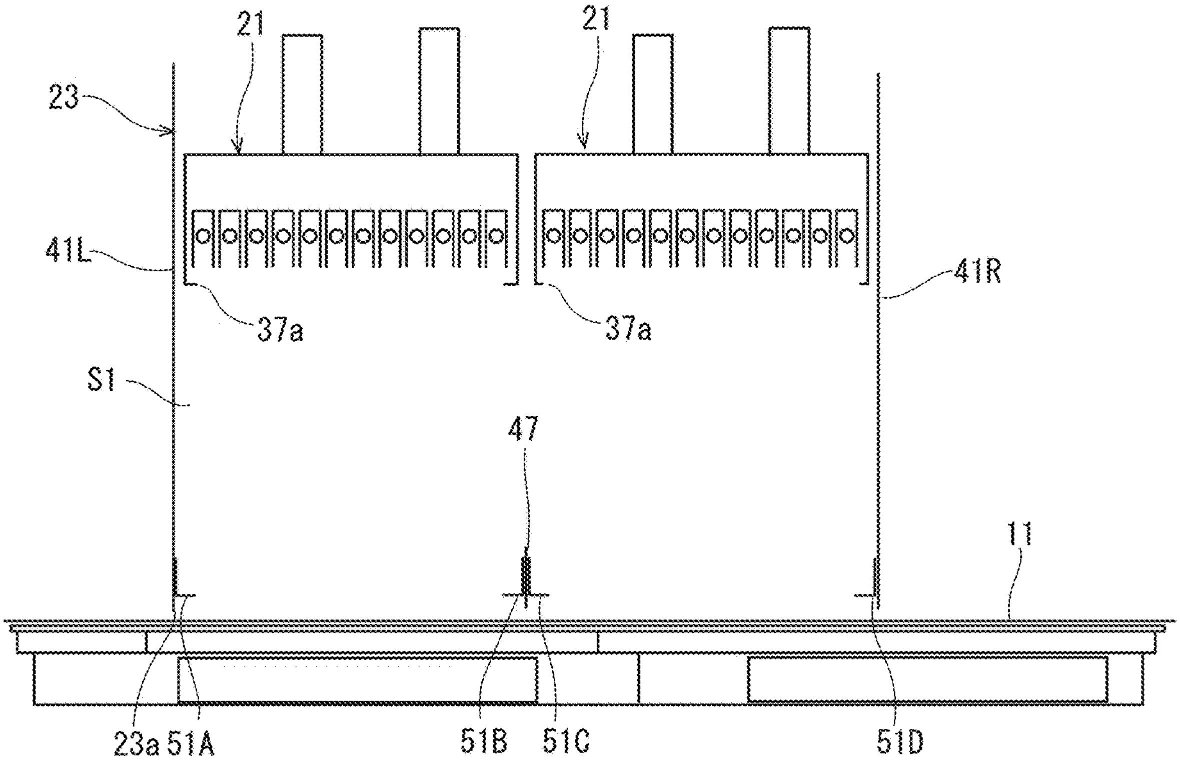
FIG. 6A is a front view showing the heater unit at standby, in the drying apparatus according to the embodiment of the present disclosure.
Figure 6B:
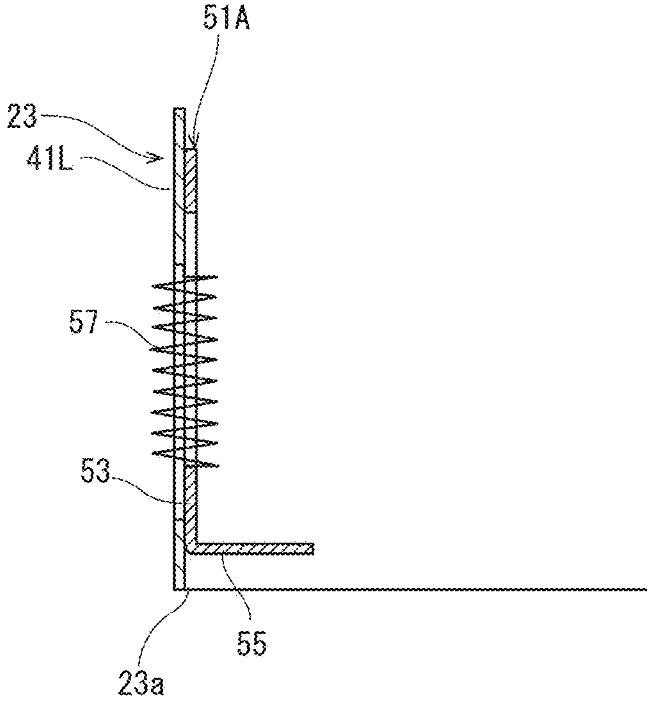
FIG. 6B is an enlarged view of a part (the closing member) of FIG. 6A.

On the other hand, when the recording medium conveyed by the conveying belt 11 is jammed, the traveling of the conveying unit 3 is stopped and the heating of the heating unit 5 is stopped. Further, as shown in FIG. 6A, the heating unit 5 is lifted to the retracted position by the lifting mechanism 25. As a result, since a space is formed between the heating unit 5 and the conveying belt 11, the jammed recording medium can be removed. Since the two heater units 21 are separated from the four closing members 51, the four closing members 51 are biased upward by the coil springs 57 as shown in FIG. 6B.

As is clear from the above description, according to the drying apparatus 1 of the present disclosure, the internal space S1 of the casing 23 and the heating space S2 are separated by the closing members 51 during the heating operation by the heating unit 5, so that the internal space S1 of the casing 23 is not heated. Therefore, the parts (in this example, the nuts, the bearings, and the others) constituting the lifting mechanism 25 (the ball screw mechanism in this example) supported on the casing 23 are not easily affected by heating.

Further, since the closing member 51 can be moved in the upper-and-lower direction within a predetermined height (between the height shown in FIG. 7A and FIG. 7B and the other height shown in FIG. 5A and FIG. 5B), even when the heating positions of the two heater units 21 are displaced in the upper-and-lower direction, the closing member 51 and the heater casing 37 can come into contact with each other to separate the internal space S1 of the casing 23 from the heating space S2. In addition, since the closing member 51 is not easily deformed unlike the sponge, the separating function can be maintained.

As the lifting mechanism 25 of the two heater units 21, a rack and pinion mechanism may be employed instead of the ball screw mechanism.

Although the present disclosure has been described in particular embodiments, the present disclosure is not limited to the foregoing embodiments. To the extent that it does not deviate from the scope and object of the present disclosure, the foregoing embodiments may be variously modified, substituted, or modified, and the claims include all embodiments that may fall within the scope of technical thought.

The invention claimed is:

1. A drying apparatus which dries a recording medium on which an image is formed, while conveying the recording medium, the drying apparatus comprising:

- a conveying unit which supports and conveys the recording medium in a predetermined conveyance direction;
- a heater unit which is disposed above the conveying unit, and blows a high temperature air to the conveyed recording medium;
- a casing in which the heater unit is housed;
- a lifting mechanism which is provided in the casing and supports the heater unit so as to be lifted and lowered; and
- a closing member which comes into contact with the heater unit when the heater unit is lowered, and separates a heating space below the heater unit from an internal space of the casing, wherein
- the closing member is lifted and lowered within a predetermined range as the heater unit is lifted and lowered.

2. The drying apparatus according to claim 1, wherein

- the closing member is supported by the casing so as to be lifted and lowered in an upper-and-lower direction by a biasing member.

3. The drying apparatus according to claim 1, wherein

- the heater unit includes a plurality of the heater units disposed adjacently, and
- the closing members are disposed between the heater units and the casing, and between the heater units.

* * * * *